US010017181B2

United States Patent
Nakada

(10) Patent No.: US 10,017,181 B2
(45) Date of Patent: Jul. 10, 2018

(54) DRIVING ASSIST APPARATUS FOR PERFORMING ASSIST ACCORDING TO DRIVER CHARACTERISTICS

(71) Applicant: HONDA MOTOR CO., LTD., Tokyo (JP)

(72) Inventor: Yuki Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/263,828

(22) Filed: Sep. 13, 2016

(65) Prior Publication Data

US 2017/0080942 A1  Mar. 23, 2017

(30) Foreign Application Priority Data

Sep. 18, 2015 (JP) .................................. 2015-184875

(51) Int. Cl.
*B60W 30/18* (2012.01)

(52) U.S. Cl.
CPC ... *B60W 30/18009* (2013.01); *B60W 2540/30* (2013.01); *B60W 2550/10* (2013.01); *B60W 2550/146* (2013.01); *B60W 2550/402* (2013.01); *B60W 2720/106* (2013.01)

(58) Field of Classification Search
CPC ....... B60W 30/18009; B60W 2550/10; B60W 2550/402; B60W 2720/106; B60W 2540/30; B60W 2550/146
See application file for complete search history.

(56) References Cited

U.S. PATENT DOCUMENTS

| 2004/0209594 | A1* | 10/2004 | Naboulsi | B60R 11/0264 |
| | | | | 455/404.1 |
| 2004/0245850 | A1* | 12/2004 | Sakai | B60T 8/1766 |
| | | | | 303/113.4 |
| 2017/0016737 | A1* | 1/2017 | Takahara | G01C 21/3484 |

FOREIGN PATENT DOCUMENTS

| JP | 2005-145246 A | 6/2005 |
| JP | 2006-096319 A | 4/2006 |
| JP | 2006-347531 A | 12/2006 |
| JP | 2008-062787 A | 3/2008 |
| JP | 4620001 B2 | 1/2011 |

OTHER PUBLICATIONS

Office Action dated Jul. 4, 2017, issued in counterpart Japanese Patent Application No. 2015-184875, with English translation. (7 pages).

* cited by examiner

*Primary Examiner* — Rodney A Butler

(74) *Attorney, Agent, or Firm* — Westerman, Hattori, Daniels & Adrian, LLP

(57) ABSTRACT

The driving assist apparatus includes a controller configured to control a decelerator included in a host vehicle to perform driving assist. The controller acquires information on the shape of a road ahead of the host vehicle in the traveling direction. When it is determined based on the acquired shape of the road that there is a curve ahead of the host vehicle in the traveling direction and driving assist is executed through control of the deceleration of the host vehicle by the decelerator, the controller controls the maximum value of deceleration of the host vehicle so as to coincide with the target deceleration value.

12 Claims, 4 Drawing Sheets

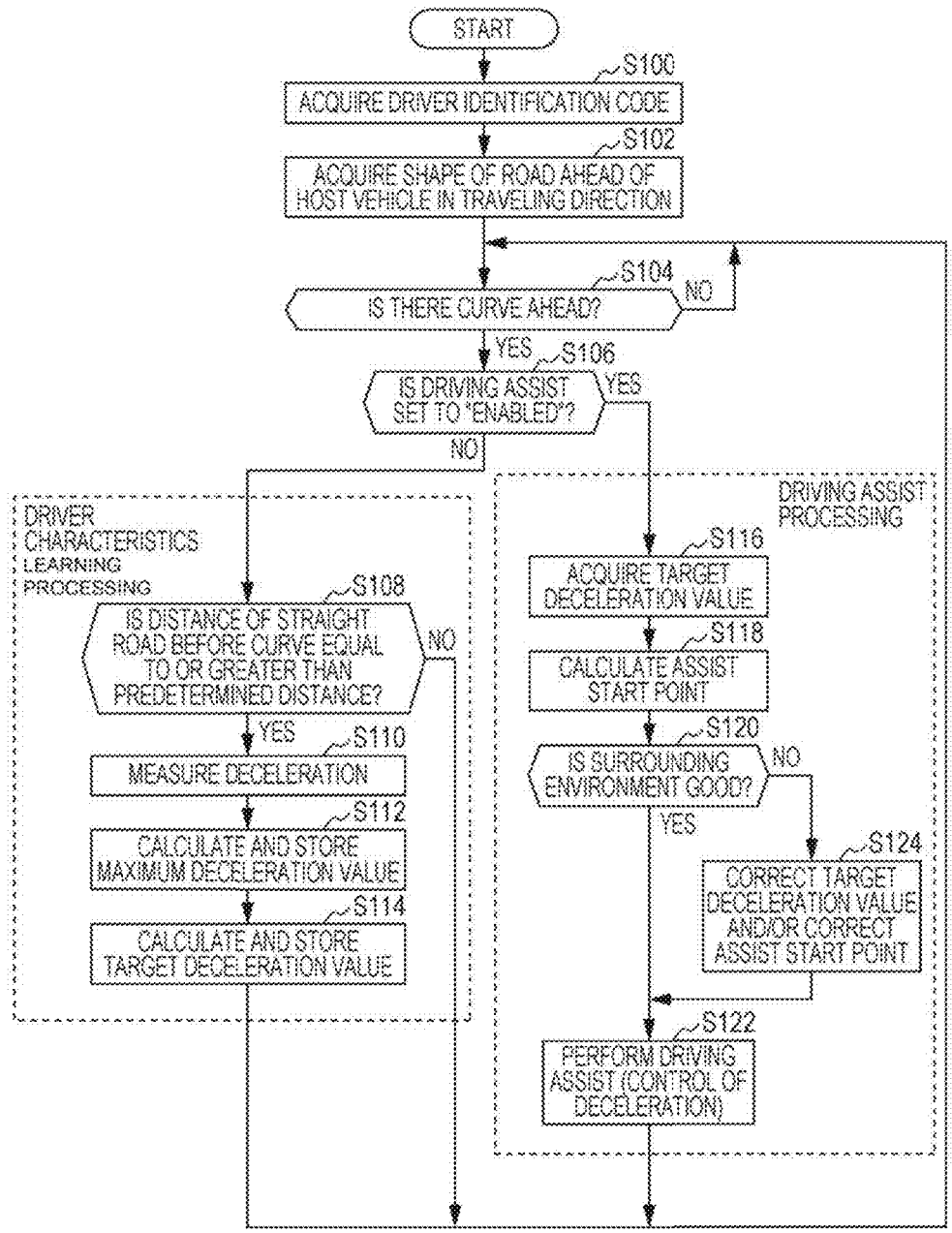

DRIVING ASSIST APPARATUS FOR PERFORMING ASSIST ACCORDING TO DRIVER CHARACTERISTICS

CROSS REFERENCES TO RELATED APPLICATIONS

The present application claims priority under 35 U.S.C. § 119 to Japanese Patent Application No. 2015-184375, filed Sep. 18, 2015, entitled "Driving Assistant Apparatus for Performing Assist According to Driver Characteristics." The contents of this application are incorporated herein by reference in their entirety.

TECHNICAL FIELD

This disclosure relates to driving assist apparatuses for assisting driving of vehicles, and particularly relates to a driving assist apparatus that learns driving characteristics of a driver, and performs driving assist in a manner depending on the learned driving characteristics of the driver.

BACKGROUND

Apparatuses for performing driving assist reflecting the driving characteristics of drivers are known. For example, Japanese Patent No. 4620001 discloses a driving assist apparatus that, before entrance of a curve, calculates the target curve entering speed from the curvature radius of the curve acquired from map information and a preset predetermined lateral acceleration, and automatically decelerates the vehicle speed to the target curve entering speed at the curve start point. In this apparatus, a threshold for determination on whether the vehicle speed reaches the target curve entering speed or not is changed according to the results from learning of the driving characteristics of the driver, and the changed threshold for determination is returned to the initial value at a timing according to the curve density (such as the number of curves existing within a predetermined distance) present ahead of the vehicle.

Moreover, Japanese Unexamined Patent Application Publication No. 2006-347531 discloses another apparatus for performing driving assist reflecting the driving characteristics of drivers. This driving assist apparatus learns the speed of a driver before entrance of a curve together with the curvature radius of the curve, and changes the target entering speed (target speed at a curve start point) preset for automatic control in a deceleration curve on a road approaching the curve from a reference value based on the results of the learning to automatically decelerate the vehicle speed.

Drivers brake in manners different from each other during driving on curve roads. The driving feeling of each driver during driving on curve roads significantly depends on the manner to decelerate until the vehicle reaches the curve start point, rather than the speed of the vehicle entering the curve start point. Accordingly, to appropriately reflect the preferences on the driving feeling of each driver in the operation of the driving assist apparatus, deceleration in the road approaching the curve before the curve start point should be focused.

Unfortunately, the objectives in driving assist of conventional drive assist apparatuses as described above are mainly to attain the target entering speed at the curve start point. In these apparatuses, the learned driving characteristics of drivers (namely, preferences of drivers) are only reflected in the threshold used in determination on whether the target entering speed coincides with the vehicle speed or in a correction amount of the target entering speed, and do not take into consideration the manners of deceleration in roads approaching curves which may affect the driving feelings of drivers.

In these conventional drive assist apparatuses, the timing and degree of deceleration in drive assist operations are automatically selected according to a variety of combinations of the target entering speed and the current vehicle speed to perform deceleration. For this reason, drivers do not know the timing when the automatic drive assist is started and how deceleration is performed, and may feel uncomfortable.

Accordingly, a driving assist apparatus is desired which can perform drive assist during driving on curve roads without giving uncomfortableness to drivers while appropriately reflecting the preferences of the drivers.

SUMMARY

One aspect of this disclosure is to provide a driving assist apparatus including a controller configured to control a decelerator included in a host vehicle to perform driving assist, wherein the controller is configured to: acquire information on a shape of a road ahead of the host vehicle in a traveling direction; when it is determined based on the acquired shape of the road that there is a curve ahead of the host vehicle in the traveling direction, measure and store a maximum value of deceleration based on sensor signals from an acceleration sensor included in the host vehicle, the deceleration being generated in the host vehicle as a result of a driving operation performed by a driver on a straight road before a start point of the curve; calculate an average of the stored maximum values of deceleration as a target deceleration value during execution of driving assist through control of the deceleration of the host vehicle by the decelerator; and when it is determined based on the acquired shape of the road that there is a curve ahead of the host vehicle in the traveling direction and driving assist is executed through control of the deceleration of the host vehicle by the decelerator, execute the control such that the maximum value of deceleration of the host vehicle coincides with the target deceleration value.

According to another aspect of this disclosure, wherein the maximum value of deceleration is measured when the distance of the straight road to the start point of the curve is equal to or more than a predetermined distance.

According to another aspect of this disclosure, the controller acquires information on whether there is an obstacle ahead of the host vehicle in the traveling direction, and when there is an obstacle on the straight road to the start point of the curve ahead of the host vehicle in the traveling direction, does not measure the maximum value of deceleration.

According to another aspect of this disclosure, the maximum value of deceleration is measured when an operation of driving assist to control deceleration of the host vehicle by the decelerator is not being executed.

According to another aspect of this disclosure, when the controller acquires information indicating that the driver performs an operation to decelerate or accelerate the host vehicle while the controller is performing driving assist through control of deceleration of the host vehicle by the decelerator, the controller stops the operation of driving assist.

According to another aspect of this disclosure, the controller is further configured to acquire information for identifying a current driver, store the calculated target deceleration value in association with the information for identifying the current driver, and execute the control such that the maximum value of deceleration of the host vehicle coincides with the target deceleration value associated with the information for identifying the current driver when the controller executes driving assist through control of deceleration of the host vehicle by the decelerator.

According to another aspect of this disclosure, the controller is further configured to acquire information on a weather condition and/or visibility surrounding the host vehicle, and correct the target deceleration value or a timing to start the driving assist based the acquired information.

BRIEF DESCRIPTION OF THE DRAWINGS

The advantages of the disclosure will become apparent in the following description taken in conjunction with the following drawings.

FIG. 5 is a flowchart illustrating an exemplary procedure of processing in the driving assist apparatus illustrated in FIG. 1.

DETAILED DESCRIPTION

Embodiments of this disclosure will now be described with reference to the drawings.

Figure 1:
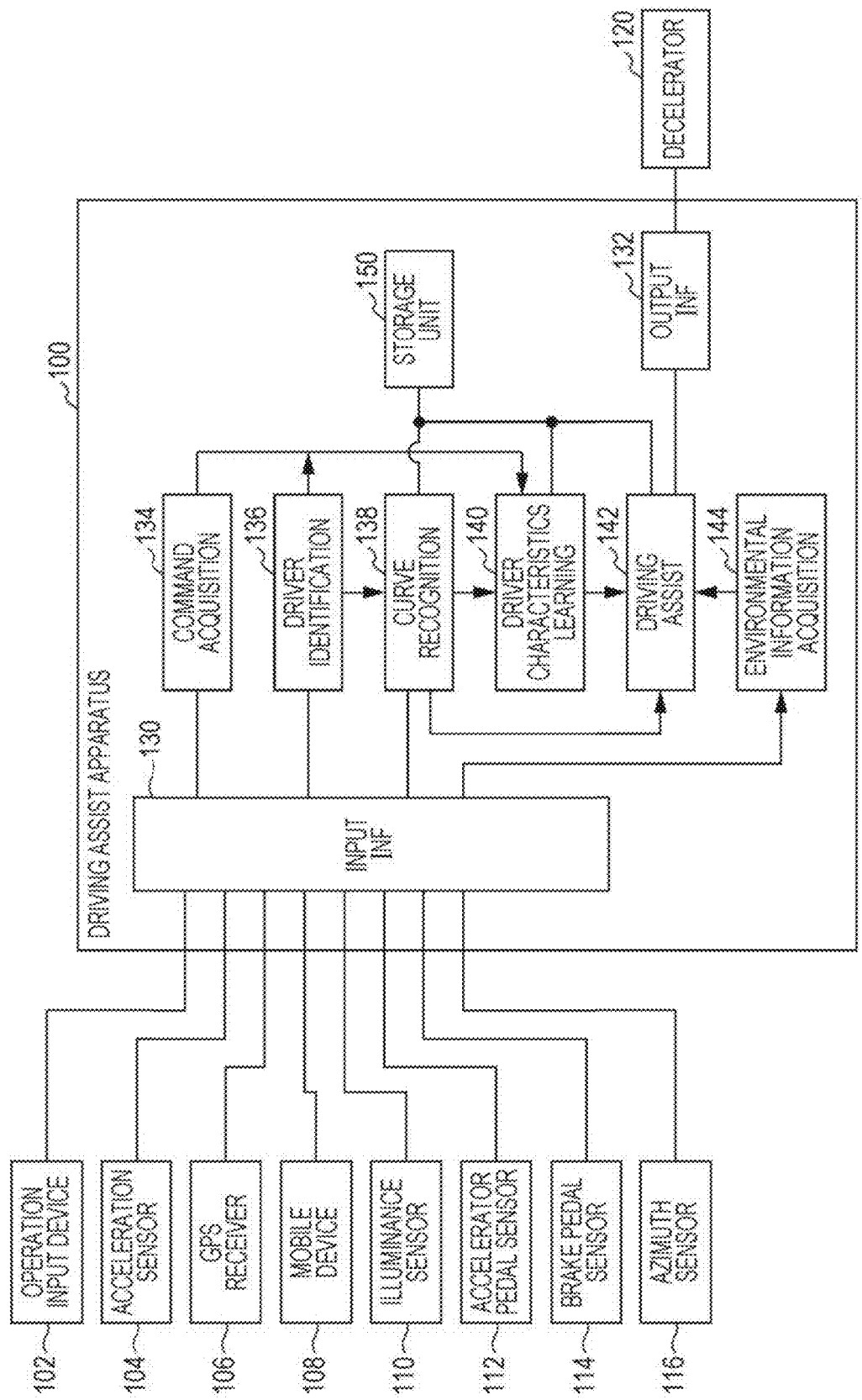
FIG. 1 is a diagram illustrating a configuration of an exemplary driving assist apparatus according to one embodiment of this disclosure.

FIG. 1 is a diagram illustrating a configuration of an exemplary driving assist apparatus according to one embodiment of this disclosure. A driving assist apparatus 100 may be part of a driving assist system such as a lane keep assist system (LKAS) or an adaptive cruise control (ACC) system.

The driving assist apparatus 100 (hereinafter, simply referred to as an "assist apparatus 100") is a computer including a processor such as a central processing unit (CPU), a read only memory (ROM) having programs written thereon, and a random access memory (RAM) for temporarily storing data. The assist apparatus 100 may be an Electronic Control Unit (ECU). The assist apparatus 100 is mounted on a vehicle for use. Hereinafter, a vehicle including the assist apparatus 100 is referred to as host vehicle.

The assist apparatus 100 acquires input signals from an operation input device 102 that performs input of commands and data by a user, such as a touch panel, a vehicle speed sensor or acceleration sensor (or acceleration/deceleration sensor) 104 that senses the vehicle speed of the host vehicle, a GPS receiver 106 that receives GPS signals from a global positioning system (GPS) satellite to specify the current position of the host vehicle, a mobile device 108 such as a smart phone, an illuminance sensor 110 that detects the brightness (illuminance) of the host vehicle in an environment, an accelerator pedal sensor 112 that senses the amount of an accelerator pedal operated by a driver, a brake pedal sensor 114 that senses the amount of a brake pedal operated by the driver, and an azimuth sensor 116 that senses the azimuth of the host vehicle in the traveling direction, and controls a decelerator 120 including a brake to decelerate the host vehicle.

The assist apparatus 100 includes an input interface (input INF) 130 that receives a variety of input signals from the sensors and the devices described above, and an output interface (output INF) 132 that outputs control signals to a decelerator 120.

The assist, apparatus 100 include a command acquiring unit 134, a driver identifying unit 136, a curve recognizing unit 138, a driver characteristics learning unit 140, a driving assist unit 142, and an environmental information acquiring unit 144.

These units included in the assist apparatus 100 are implemented through execution of the programs by the computer, i.e., the assist apparatus 100. The computer programs can be stored in any computer-readable storage medium. Alternatively, each of the units can be completely or partially configured with hardware including one or more electronic circuit parts.

The assist apparatus 100 further includes a storage unit 15D that stores and memorizes map information and the like.

The command acquiring unit 134 acquires the commands and the data input through the operation input device 102 by the driver through the input INF 130. In particular, the command acquiring unit 134 acquires a driving assist instruction command to enable driving assist by the driving assist unit 142 (described later), and sets an assist setting flag stored in the storage unit 150 and indicating whether driving assist is enabled or not, where the assist setting flag set to 0 indicates that driving assist is "disabled" and the assist setting flag set to 1 indicates that driving assist is "enabled", for example. Hereinafter, the term "driving assist is set to "enabled"" indicates that the assist setting flag is set to 1, and the term "driving assist is set to "disabled"" indicates that the flag is set to 0.

The driver identifying unit 136 identifies the current driver, for example, by acquiring the driver identification code, which is input into the operation input device 102 by the driver, through the command acquiring unit 134, or by acquiring the driver identification code preliminarily input into the mobile device 108 by the driver through reading of the driver identification code from the mobile device 108.

The curve recognizing unit 138 specifies the current position of the host vehicle using GPS signals received from the GPS receiver 106, the map information stored in the storage unit 150, and sensor signals from the azimuth sensor 116, and acquires the shape of a road ahead of the host vehicle in the traveling direction to determine whether there is a curve in the road ahead of the host vehicle in the traveling direction. If there is a curve, the curve recognizing unit 138 acquires the curvature radius of the curve from the map information, and specifies the length or distance of the straight road extending from each start point of the curve toward the host vehicle (hereinafter, referred to as "straight road before a curve").

When the curve recognizing unit 138 determines that there is a curve, the driver characteristics learning unit 140 measures the maximum value of deceleration using sensor signals from the acceleration sensor included in the host vehicle. The deceleration occurs in the host vehicle as a result of a driving operation in the straight road before the curve until the driver reaches the start point of the curve on the condition that the distance of the straight road before the curve is equal to or more than a predetermined distance. Then, the driver characteristics learning unit 140 stores the maximum value of deceleration in the storage unit in association with the driver identification code of the current driver. In other words, the driver characteristics learning unit 140 learns the maximum value of deceleration as driver characteristics indicating preferred driving feeling of the driver.

When the number of the maximum values of deceleration for the current driver stored in the storage unit 150 is equal to or more than a predetermined number thereof, the driver characteristics learning unit 140 calculates the average of the maximum values as the target deceleration value, and stores the calculated target deceleration value in the storage unit 150 in association with the driver identification code of the current driver. The stored target deceleration value is used by the driving assist unit 142 during execution of driving assist.

The maximum value of deceleration is measured on the condition that the distance of the straight road before the curve is equal to or more than a predetermined distance. If the distance is significantly short, the deceleration of the host vehicle occurring as a result of the driving operation of the driver occurs mainly due to a restriction on the distance of the straight road before the curve, i.e., due to a short distance thereof, and the preferences of the driver in driving feeling are not reflected in such deceleration.

In addition to this condition, the maximum value of deceleration may be measured and stored on the condition that there are no obstacles (such as a walker crossing the road or a preceding vehicle) to ensure the measurement of deceleration reflecting the preferences of the driver in driving feeling. Such obstacles can be detected through processing of images captured by a camera (not illustrated) included in the host vehicle using a known method.

When the curve recognizing unit 138 determines that there is a curve on the condition that driving assist is set at "enabled", the driving assist unit 142 executes driving assist of the drive to the start point of the curve through control of deceleration of the host vehicle by the decelerator 120.

In particular, the driving assist unit 142 controls the decelerator 120 such that the maximum value of deceleration of the host vehicle occurring during the driving assist coincides with the target deceleration value. Specifically, the driving assist unit 142 acquires the curvature radius of the curve existing ahead of the host vehicle in the traveling direction from the curve recognizing unit 138, and calculates the target entering speed at a point of time of entering the start point of the curve from a preset allowable lateral acceleration during driving a curve and the acquired curvature radius.

Then, the driving assist unit 142 calculates a position (assist start point) on the road to start driving assist to reduce the vehicle speed to the target entering speed on the condition that the deceleration value coincides with the maximum deceleration value. Subsequently, when the host vehicle reaches the assist start point, the driving assist unit 142 starts driving assist, and controls the decelerator 120 such that the maximum value of deceleration coincides with the target deceleration value, thereby executing driving assist so as to control the vehicle speed of the host vehicle at the curve start point to the target entering speed. After the host vehicle passes through the curve start point, the driving assist unit 142 terminates the operation of driving assist.

Furthermore, using the accelerator pedal sensor 112 and the brake pedal sensor 114, the driving assist unit 142 detects whether the driver operates the accelerator pedal or the brake pedal during execution of the operation of driving assist. When operation of the accelerator pedal or the brake pedal by the driver is detected, the driving assist unit 142 stops the operation of driving assist.

Based on the information on the weather condition and/or the information on visibility ahead of the host vehicle in the traveling direction acquired by the environmental information acquiring unit 144 (described later), the driving assist unit 142 corrects the target deceleration value stored in the storage unit 150 by multiplying the target deceleration value by a coefficient of a predetermined percentage, and executes driving assist using the corrected target deceleration value. For example, the driving assist unit 142 corrects the target deceleration value to have a smaller value when it is determined that the weather condition and/or visibility is not desirable for driving of the host vehicle.

In addition to or instead of this, when it is determined that the weather condition and/or visibility is not desirable for driving of the host vehicle, to reduce the distance (or time) to keep the maximum deceleration (that is, the target deceleration value), the driving assist unit 142 corrects the assist start point or the timing to start driving assist such that the operation of driving assist is started at a timing earlier than the predetermined timing. Throughout the specification, the term "when it is determined that the weather condition and/or environmental illuminance is not desirable for driving of the host vehicle" means bad weather such as rain, fog, and snow, night driving on dark roads, and sudden changes of the environment illuminance at exits of tunnels, for example.

The environmental information acquiring unit 144 acquires the weather information (such as generation of rain, fog, and snow or the presence/absence of its possibility) from the mobile device 108 connected to the driving assist apparatus, and/or based on the sensor signals from the illuminance sensor 110, acquires the information on the degree of the environment illuminance and the change thereof.

Figure 2:
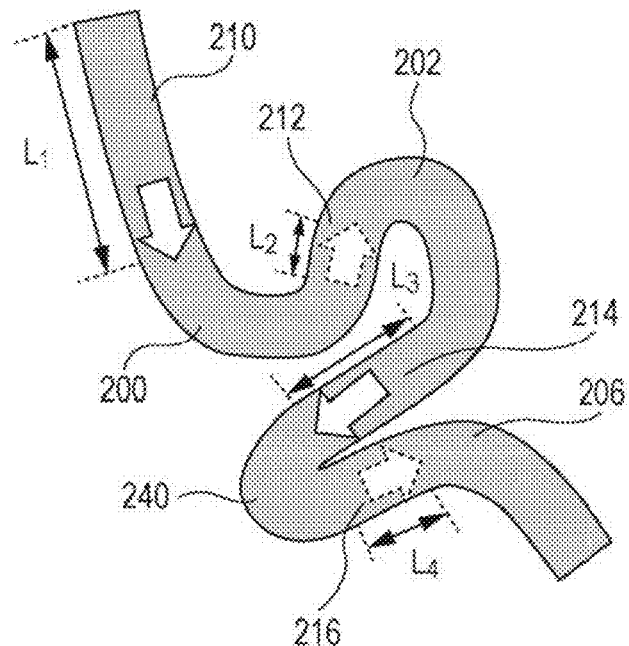
FIG. 2 is a diagram for illustrating measurement of the maximum value of deceleration in a straight road before a curve performed by the driving assist apparatus illustrated in FIG. 1.

FIG. 2 is a diagram for illustrating measurement of the maximum deceleration value in a straight road before a curve by the driver characteristics learning unit 140. In the example illustrated in FIG. 2, the host vehicle drives from the upper corner on the left to the lower corner on the right in the drawing. The road in the example has curves 200, 202, 204, and 206, which can be recognized by the curve recognizing unit 138. There are straight road sections 210, 212, 214, and 216 before the respective curves (side of the host vehicle entering the road from the upper corner on the left). The straight road sections 210, 212, 214, and 216 before the respective curves have distances $L_1$, $L_2$, $L_3$, and $L_4$, respectively.

As the host vehicle entering the road represented by a gray color in the drawing goes from the upper corner on the left to the lower corner on the right, the curve recognizing unit 138 sequentially recognizes the curves 200, 202, 204, and 236 and the straight road sections 210, 212, 214, and 216 before the curves, respectively. Thereby, the driver characteristics learning unit 140 measures the deceleration of the host vehicle occurring as a result of the driving operation performed by the driver when the host vehicle enters the curves 200 to 206.

At this time, whether the deceleration of the host vehicle is generated by the driving operation by the driver or by the operation of driving assist by the driving assist unit 142 can be determined by determining whether the driving assist by the driving assist unit 142 is set to "disabled" or not. In other words, when the driving assist is set to "disabled," the driver characteristics learning unit 140 determines that the deceleration of the host vehicle is generated by the driving operation by the driver, and starts the measurement. When driving assist is set to "enabled," the driver characteristics learning unit 140 does not start the measurement.

The driver characteristics learning unit 140 sequentially compares the distances $L_1$, $L_2$, $L_3$, and $L_4$ of the straight road sections before the curves with a predetermined distance $L_0$. For examples, in the straight road sections 210 and 214 before the curves having the distances $L_1$ and $L_3$ equal to or more than the predetermined distance $L_0$, the driver characteristics learning unit 140 measures the deceleration of the host vehicle during driving in the straight road sections 210 and 214 before the curves. In FIG. 2, the solid white arrows with straight lines indicate that the measurement of deceleration is performed in the straight road sections 210 and 214 before the curves indicated by these arrows, and solid white arrows with dotted lines indicate that the measurement of deceleration is not performed.

Figure 3:
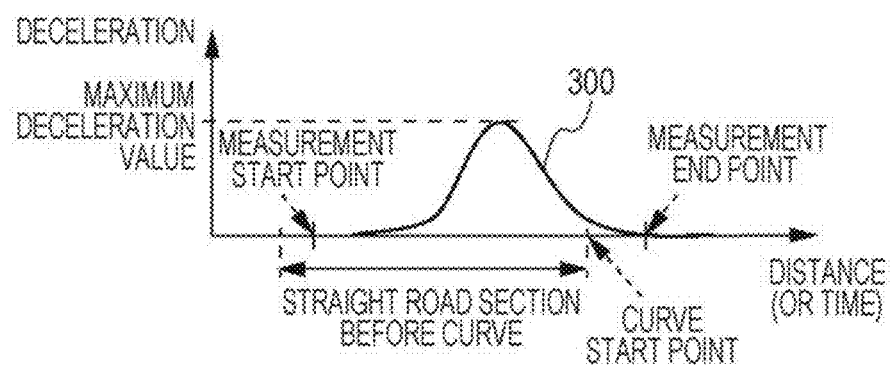
FIG. 3 is a diagram illustrating an exemplary transition of deceleration of a host vehicle measured by the driving assist apparatus illustrated in FIG. 1.

FIG. 3 is a diagram illustrating an example of transition of deceleration measured by the driver characteristics learning unit 140. In FIG. 3, the abscissa indicates a distance (or time), and the ordinate indicates deceleration. A curve 300 indicates the transition of deceleration measured by the driver characteristics learning unit 140. In this example, the driver characteristics learning unit 140 starts the measurement of deceleration after the host vehicle passes through the start point of the straight road section before the curve, and terminates the measurement after the host vehicle passes through the end point of the straight road section before a curve (accordingly, the curve start point). Then, the driver characteristics learning unit 140 specifies and stores the maximum deceleration value, which is the peak value of the curve 300 indicating the transition of deceleration. As described above, the maximum deceleration value is stored in the storage unit 150 in association with the driver identification code acquired by the driver identifying unit 136.

Figure 4A:
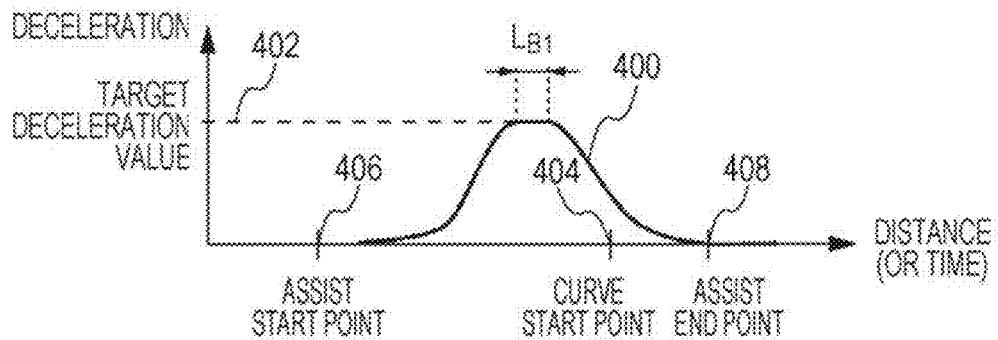
FIGS. 4A to 4C are diagram illustrating an example of control of deceleration in driving assist performed by the driving assist apparatus illustrated in FIG. 1.
Figure 4B:
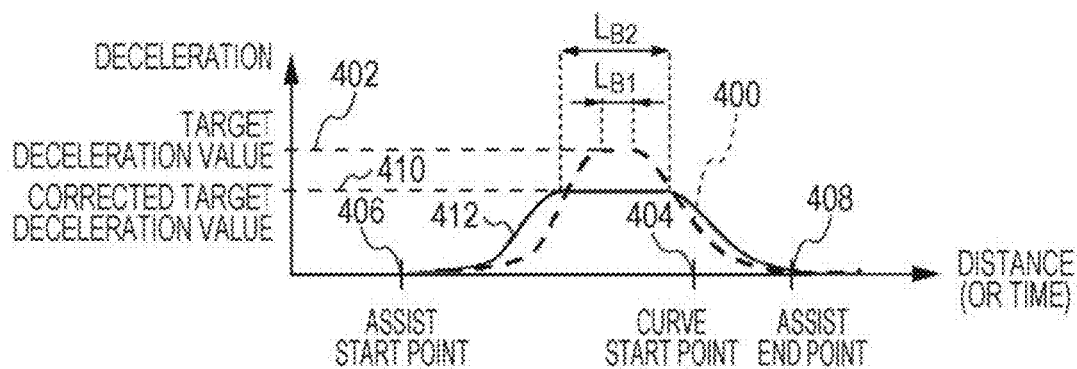
Figure 4C:
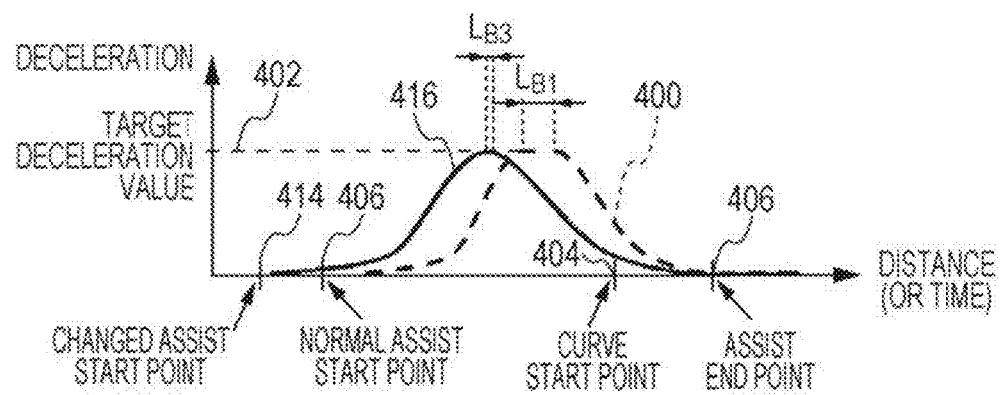

FIGS. 4A to 4C are diagrams illustrating an example of driving assist (automatic deceleration operation) on a curve executed by the driving assist unit 142 using the maximum deceleration value indicating the learned (stored) driver characteristics. In FIGS. 4A to 4C, the abscissa indicates the distance (or time), the ordinate indicates the deceleration occurring in the host vehicle through control of the decelerator 120 by the driving assist unit 142.

FIG. 4A is a diagram illustrating an aspect of control of deceleration in the driving assist operation under a normal environment having no bad weather or low-visibility. A curve 400 indicates the transition of deceleration controlled by driving assist unit 142. The driving assist unit 142 sets the maximum value of deceleration to be generated in the host vehicle in the target deceleration value 402 calculated and stored in the driver characteristics learning unit 140. For example, the driving assist unit 142 adjusts the length of the distance (or time) $L_{B1}$ along which the target deceleration value 402 as the maximum deceleration value is kept. Thereby, the driving assist unit 142 controls the current vehicle speed of the host vehicle to coincide with the target entering speed at the curve start point 404. The assist start point 406 is set under constrains of a predetermined deceleration increase rate and a predetermined deceleration reduction rate set in advance in the range not causing sudden braking such that the length $L_{B1}$ needed to reduce the current vehicle speed of the host vehicle to the target entering speed at the curve start point 404 can be ensured. The assist operation is terminated at a point 408 where deceleration is almost zero, for example.

In contrast, FIGS. 4B and 4C are diagrams illustrating examples of aspects of control of deceleration in the assist operation when the driving assist unit 142 determines that the weather condition and/or visibility is not desirable for the driving of the host vehicle based on the information on the weather condition and/or the information on visibility ahead of the host vehicle in the traveling direction acquired by the environmental information acquiring unit 144.

In the example illustrated in FIG. 4B, the target deceleration value 402 is corrected to have a smaller value by multiplying the target deceleration value 402 by a predetermined coefficient, and the deceleration is controlled using the corrected target deceleration value 410. A curve 412 indicates the transition of deceleration controlled by the driving assist unit 142. In FIG. 4B, the deceleration transition curve 400 in the normal environment illustrated in FIG. 4A is represented by the dotted line for comparison purpose. In the examples of FIG. 4B, the corrected target deceleration value 410 has a smaller value than the normal target deceleration value 402. For this reason, the driving assist unit 142 controls the distance $L_{B2}$ to keep the corrected target deceleration value 410 to be longer than the distance $L_{B1}$ to keep the normal target deceleration value 402, thereby controlling the vehicle speed at the curve start point 404 to coincide with the target entering speed.

In the example illustrated in FIG. 4C, the maximum deceleration value used in the assist operation is not changed from the target deceleration value 402 in the normal environment. To reduce the distance (or time) in which the deceleration is kept at the target deceleration value 402 by deceleration, an assist start point 414 is changed from the assist start point 406 in the normal environment such that the assist start point 414 is set before the assist start point 406. A curve 416 indicates the transition of deceleration controlled by driving assist unit 142. In FIG. 4C, the deceleration transition curve 400 in the normal environment illustrated in FIG. 4B is represented by the dotted line for comparison purpose. In the example of FIG. 4C, the assist start point 414 is set such that the distance $L_{B3}$ to keep the target deceleration value 402 of deceleration is shorter than the distance $L_{B1}$ to keep the target deceleration value 402 in the normal environment, and the vehicle speed at the curve start point 404 coincides with the target entering speed.

Thus, the assist apparatus 100 learns the maximum value of deceleration generated by the deceleration operation performed before the curve by the driver as an index indicating the driver characteristics or the preferred driving feeling of the driver, and controls the decelerator 120 during the driving assist operation such that the average of the learned maximum value coincides with the maximum deceleration value during assisted drive before the curve. For this reason, the drivers can predict how deceleration is performed during driving assist before a curve by the driving assist apparatus 100 (in other words, the drivers can predict the driving feeling during the assist operation because the maximum deceleration is fixed to the target deceleration value). Accordingly, the driving assist apparatus 100 can execute driving assist reflecting the preferences of the drivers without giving uncomfortableness to the drivers.

The aspect of control of deceleration in the driving assist illustrated in FIGS. 4A to 4C are only exemplary, and control of deceleration will not be limited to this. Namely, deceleration can be controlled in various ways under the condition that the maximum value of deceleration in deceleration control in the assist operation is set to the target deceleration value or the corrected target deceleration value. For example, in bad weather, the target deceleration value can be corrected to a smaller value, and the assist start point can be set before the normal assist start point. Although the deceleration transition curve illustrated in FIGS. 4A to 4C is monomodal, the deceleration transition curve can be multimodal under the condition that the maximum deceleration value is set to the target deceleration value.

The procedure of the processing of the assist apparatus 100 will now be described according to the flowchart illustrated in FIG. 5. The processing starts when the power supply of the assist apparatus 100 is turned on. In parallel with this processing, when a driving assist instruction command indicating whether the driving assist is set to "enabled" or not is input, through the operation input device 102 by the driver, the command acquiring unit 134 sets the assist setting flag stored in the storage unit 150 to "enabled" or "disabled" according to the driving assist instruction command. Similarly, in parallel with this processing, the environmental information acquiring unit 144 acquires the information on the weather from the mobile device 103 appropriately or at predetermined interval of time, and/or acquires the information on the degree of environment illuminance and a change thereof based on the sensor signals from the illuminance sensor 110, and notifies the driving assist unit 142 of the information.

When the processing starts, first, the driver identifying unit 136 acquires the driver identification code through the operation input device 102 or the mobile device 108 (S100). The curve recognizing unit 138 acquires the shape of a road ahead of the host vehicle in the traveling direction using the GPS signals received from the GPS receiver 106, the map information stored in the storage unit 150, and the sensor signals from the azimuth sensor 116 (S102), and determines whether there is a curve ahead of the host vehicle in the traveling direction (S104).

If there is no curve (S104, No), the processing returns to Step S102, and is repeated. If there is a curve (S104, Yes), it is determined whether the driving assist is set to "enabled" (S106). If the driving assist is set to "disabled" (S106, No), the driver characteristics learning processing starting from Step S108 is executed.

The driving characteristics learning processing is executed by the driver characteristics learning unit 140. In the driving characteristics learning processing, first, it is determined whether the distance of the straight road before the curve detected in Step S104 is equal to or more than the predetermined distance (S108). If the distance is less than the predetermined distance (S108, No), the processing returns to Step S104, and is repeated. If the distance of the straight road before the curve is equal to or more than the predetermined distance (S108, Yes), based on the sensor signals output from the acceleration sensor 104, the deceleration of the host vehicle is repeatedly acquired and measured (for example, at a predetermined interval of time or distance) until the host vehicle reaches the start point of the curve (S110). Then, the maximum value of deceleration is calculated from the measured deceleration, and the calculated maximum deceleration value is stored in the storage unit 150 in association with the driver identification code (S112).

If the number of the maximum deceleration values stored in the storage unit 150 in association with the driver identification code is equal to or more than a predetermined number, the average of these maximum deceleration values is calculated as the target deceleration value, the calculated target deceleration value is stored in the storage unit 150 in association with the driver identification code (S114). Then, the driver characteristics learning processing is terminated, and the processing returns to Step S102, and is repeated.

If the driving assist is enabled in Step S106 (S106, Yes), the driving assist processing starting from Step S116 is executed. The driving assist processing is executed by the driving assist unit 142.

In the driving assist processing, first, the target deceleration value associated with the driver identification code of the current driver stored in the storage unit 150 is acquired (S116). Based on the acquired target deceleration value, the curvature radius of the curve, and the target entering speed at the curve start point determined from a predetermined lateral acceleration, and the current speed of the host vehicle, the position to start driving assist (assist start point) is calculated (S118).

Subsequently, based on the information on the weather and/or the information on the degree of environment illuminance and the change thereof notified from the environmental information acquiring unit 144, the driving assist unit 142 determines whether the surrounding environment is good for driving or not (S120). If the surrounding environment is good for driving (S120, Yes), driving assist is executed according to the target deceleration value acquired in Step S116 and the assist start point calculated in Step S118 (S122). In other words, deceleration of the host vehicle is controlled through control of the decelerator 120 such that the maximum deceleration value coincides with the target deceleration value.

If the surrounding environment is not good for driving (S120, No), the target deceleration value acquired in Step S116 is corrected (to a smaller value, for example), and/or the assist start point calculated in Step S118 is corrected such that the assist start point is set before the curve start point (S124). Then, the processing goes to Step S122, In this case, driving assist is executed in Step S122 according to the target deceleration value corrected in Step S124 and/or the corrected assist start point.

After driving assist is executed in Step S120, the driving assist processing is terminated. The processing goes to Step S102, and is repeated.

During execution of driving assist in Step 120, the driving assist unit 142 can control an actuator (not illustrated) applying an reaction force to the accelerator pedal and/or the brake pedal included in the host vehicle to apply an reaction force to the accelerator pedal and/or the brake pedal, thereby informing the driver that the driving assist is being executed.

If the driver operates the accelerator pedal and/or brake pedal (for example, with a force equal to or more than a predetermined pressing force) during execution of driving assist in Step 120, the driving assist unit 142 can stop the driving assist as an interruption in Step 120, and the processing goes to Step S104.

As described above, the driving assist apparatus 100 according to the present embodiment learns the maximum value of deceleration occurring in the deceleration operation performed before a curve by the driver as an index indicating the preferred driving feeling (driving characteristics) of the driver, and controls the decelerator 120 during the driving assist operation such that the average of the learned maximum value coincides with the maximum deceleration value during assisted driving before the curve. For this reason, the drivers can predict how deceleration is performed during driving assist before a curve by the driving assist apparatus 100. As a result, driving assist well reflecting the preferences of drivers can be performed without giving uncomfortableness to drivers.

Although the shape of a road ahead of the host vehicle in the traveling direction is acquired based on the GPS signals received by the GPS receiver 106, the map information stored in the storage unit 150, and the sensor signals from the azimuth sensor 116 in the embodiment described above, the method of acquiring the shape of the road will not be limited to this. For example, the shape of a road ahead of the host vehicle in the traveling direction may be acquired through image processing of images in front of the host vehicle taken by a camera (not illustrated) included in the host vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A driving assist apparatus comprising:
   a controller configured to control a decelerator included in a host vehicle to perform driving assist,
   wherein the controller is configured to:
      acquire information on a shape of a road ahead of the host vehicle in a traveling direction;
      when it is determined, based on the acquired shape of the road, that there is a curve ahead of the host vehicle in the traveling direction,
         measure and store a maximum value of deceleration, based on sensor signals from an acceleration sensor included in the host vehicle, the deceleration being caused in the host vehicle as a result of a driving operation performed by a driver on a straight road located before a start point of the curve;
         calculate an average of the stored maximum values of deceleration as a target deceleration value being used during execution of the driving assist through control of the deceleration of the host vehicle by the decelerator; and
      when it is determined, based on the acquired shape of the road, that there is the curve ahead of the host vehicle in the traveling direction, and that driving assist is executed through control of the deceleration of the host vehicle by the decelerator,
         execute the control of the deceleration of the host vehicle by the decelerator for the driving assist such that the maximum value of deceleration of the host vehicle during the driving assist coincides with the target deceleration value to reflect preference of the driver to the driving assist and the deceleration of the host vehicle before entering the curve.

2. The driving assist apparatus according to claim 1,
   wherein the controller is configured to measure the maximum value of deceleration on condition that the distance of the straight road to the start point of the curve is equal to or more than a predetermined distance.

3. The driving assist apparatus according to claim 1,
   wherein the controller
      acquires information on whether there is an obstacle ahead of the host vehicle in the traveling direction, and
      when there is an obstacle on the straight road to the start point of the curve ahead of the host vehicle in the traveling direction,
         does not measure the maximum value of deceleration.

4. The driving assist apparatus according to claim 1,
   wherein the controller is configured to measure the maximum value of deceleration on condition that an operation of driving assist to control deceleration of the host vehicle by the decelerator is not being executed.

5. The driving assist apparatus according to claim 1,
   wherein when the controller acquires information indicating that the driver performs an operation to decelerate or accelerate the host vehicle while the controller is performing driving assist through control of deceleration of the host vehicle by the decelerator, the controller stops the operation of driving assist.

6. The driving assist apparatus according to claim 1,
   wherein the controller is further configured to
      acquire an identification information of a current driver,
      store the calculated target deceleration value in association with the identification information of the current driver, and
      execute the control such that the maximum value of deceleration of the host vehicle coincides with the target deceleration value associated with the identification information of the current driver when the controller executes driving assist through control of deceleration of the host vehicle by the decelerator.

7. The driving assist apparatus according to claim 1,
   the controller is configured to
      acquire information on a weather condition and/or visibility surrounding the host vehicle, and
      correct the target deceleration value or a timing to start the driving assist based on the acquired information.

8. The driving assist apparatus according to claim 7,
   wherein the controller is further configured to reduce the target deceleration value in accordance with the weather condition or the visibility.

9. The driving assist apparatus according to claim 7,
   wherein the controller is further configured to move start timing of the driving assist to an earlier point in accordance with the weather condition or the visibility.

10. The driving assist apparatus according to claim 9,
    wherein the controller is further configured to reduce distance to keep the maximum deceleration during performing the driving assist.

11. A vehicle comprising a driving assist apparatus the driving assist apparatus comprises:
    a controller configured to control a decelerator included in a host vehicle to perform driving assist,
    wherein the controller is configured to:
    acquire information on a shape of a road ahead of the host vehicle in a traveling direction;
    when it is determined, based on the acquired shape of the road, that there is a curve ahead of the host vehicle in the traveling direction,
       measure and store a maximum value of deceleration, based on sensor signals from an acceleration sensor included in the host vehicle, the deceleration being caused in the host vehicle as a result of a driving operation performed by a driver on a straight road located before a start point of the curve;
       calculate an average of the stored maximum values of deceleration as a target deceleration value being used during execution of the driving assist through control of the deceleration of the host vehicle by the decelerator; and
    when it is determined, based on the acquired shape of the road, that there is the curve ahead of the host vehicle in the traveling direction, and that driving assist is executed through control of the deceleration of the host vehicle by the decelerator,
       execute the control of the deceleration of the host vehicle by the decelerator for the driving assist such that the maximum value of deceleration of the host vehicle during the driving assist coincides with the target deceleration value to reflect preference of the driver to the driving assist and the deceleration of the host vehicle before entering the curve.

12. A driving assist method for a host vehicle comprising steps of:

acquiring, by a computer, information on a shape of a road ahead of the host vehicle in a traveling direction;

determining, by the computer, based on the acquired shape of the road, whether there is a curve ahead of the host vehicle in the traveling direction, and if so, measuring and storing, by the computer, a maximum value of deceleration, based on sensor signals from an acceleration sensor included in the host vehicle, the deceleration being caused in the host vehicle as a result of a driving operation performed by a driver on a straight road located before a start point of the curve, and calculating, by the computer, an average of the stored maximum values of deceleration as a target deceleration value being used during execution of the driving assist through control of the deceleration of the host vehicle by the decelerator; and determining, by the computer, based on the acquired shape of the road, whether there is the curve ahead of the host vehicle in the traveling direction and driving assist is executed through control of the deceleration of the host vehicle by the decelerator, and if so, executing, by the computer, the control of the deceleration of the host vehicle by the decelerator for the driving assist such that the maximum value of deceleration of the host vehicle during the driving assist coincides with the target deceleration value to reflect preference of the driver to the driving assist and the deceleration of the host vehicle before entering the curve.

* * * * *